(12) United States Patent
Singh

(10) Patent No.: US 10,793,198 B2
(45) Date of Patent: Oct. 6, 2020

(54) METHOD OF MANUFACTURING A STRUCTURAL COMPONENT

(71) Applicant: Jaswinder Pal Singh, Shelby Township, MI (US)

(72) Inventor: Jaswinder Pal Singh, Shelby Township, MI (US)

(73) Assignee: MAGNA INTERNATIONAL INC., Aurora (CA)

( * ) Notice: Subject to any disclaimer, the term of this patent is extended or adjusted under 35 U.S.C. 154(b) by 60 days.

(21) Appl. No.: 16/302,656

(22) PCT Filed: Jun. 15, 2017

(86) PCT No.: PCT/US2017/037624
§ 371 (c)(1),
(2) Date: Nov. 18, 2018

(87) PCT Pub. No.: WO2017/218740
PCT Pub. Date: Dec. 21, 2017

(65) Prior Publication Data
US 2019/0126987 A1    May 2, 2019

Related U.S. Application Data

(60) Provisional application No. 62/350,402, filed on Jun. 15, 2016.

(51) Int. Cl.
*B62D 25/04* (2006.01)
*B62D 29/00* (2006.01)
(Continued)

(52) U.S. Cl.
CPC ........... *B62D 25/04* (2013.01); *B21D 35/003* (2013.01); *B62D 25/02* (2013.01); *B62D 29/007* (2013.01)

(58) Field of Classification Search
CPC ...... B62D 25/04; B62D 25/02; B62D 29/007; B21D 35/003
See application file for complete search history.

(56) References Cited

U.S. PATENT DOCUMENTS 2,284,697 A    6/1942  Trautvetter
5,588,694 A *  12/1996  Koehr ................. B60R 21/13
                                                    280/756
(Continued)

FOREIGN PATENT DOCUMENTS

DE    4137481 A1   5/1993
EP    1842605 A2   10/2007
FR    2921889 A1   4/2009

*Primary Examiner* — D Glenn Dayoan
*Assistant Examiner* — Melissa Ann Bonifazi
(74) *Attorney, Agent, or Firm* — Dickinson Wright PLLC

(57) ABSTRACT

A steel door ring for an automotive vehicle including a reinforcement to increase the strength of desired areas of the door ring is provided. The door ring can be manufactured with reduced cycle time and thus improved efficiency. The method includes hot stamping the reinforcement as part of the same blank used to form the remainder of the door ring. During the hot stamping step, the reinforcement portion used to form the reinforcement is located in a free space, for example in a door opening between pillars and rails. Unlike comparative processes, the reinforcement portion used to form the reinforcement is not welded to a pillar of the door ring prior hot stamping. After hot stamping, the reinforcement is trimmed from the door ring, and then attached in a desired location, for example by welding.

18 Claims, 4 Drawing Sheets

(51) Int. Cl.
*B62D 25/02* (2006.01)
*B21D 35/00* (2006.01)

(56) References Cited

U.S. PATENT DOCUMENTS

2005/0189790 A1 9/2005 Chernoff et al.
2010/0327630 A1 12/2010 Klimek et al.

* cited by examiner

METHOD OF MANUFACTURING A STRUCTURAL COMPONENT

CROSS-REFERENCE TO RELATED APPLICATIONS

This U.S. National Stage Patent Application claims the benefit of PCT International Patent Application Serial No. PCT/US2017/037624 filed Jun. 15, 2017 entitled "Method Of Manufacturing A Structural Component" which claims the benefit of and priority to U.S. Provisional Patent Application Ser. No. 62/350,402 filed Jun. 15, 2016 entitled "Method Of Manufacturing A Structural Company,", the entire disclosures of the applications being considered part of the disclosure of this application, and hereby incorporated by reference.

BACKGROUND OF THE INVENTION

1. Field of the Invention

The invention relates generally to structural components for automotive vehicles, more particularly to door rings formed of steel, and methods of manufacturing the same.

2. Related Art

High strength structural components formed of steel for automotive vehicles, such as door rings or pillars, are designed with high strength to meet crash standards set by the automotive industry. Oftentimes, a reinforcement, also formed of a metal material, is attached to one of the pillars of the door ring to increase the strength in that area. For example, as best illustrated in FIG. 1, according to the prior art processes, a reinforcement portion 10 used to form the reinforcement is first welded or otherwise attached to the door ring blank 12 in adjacent and overlaying with the pillar portion 14 for which it is intended to reinforce. The blank 12 including the reinforcement portion 10 attached to the pillar portion 14 is then heated and hot stamped in a die together with one another. However, due to the increased thickness in the area where the pillar is reinforced and the air gaps present between the reinforcement portion 10 and the pillar portion 14 of the blank 12, this process requires a long heating time and long cooling time. In other words, the increased thickness in the area of the reinforcement area as well as the air gaps between the reinforcement and pillar portions 10, 14 of the blank 12 slows the cycle times, and thus reduces efficiency of the prior art process.

SUMMARY AND ADVANTAGES OF THE INVENTION

The invention provides a structural component, such as a door ring, for an automotive vehicle. The door ring includes a plurality of pillars and rails surrounding at least one door opening, for example an A-pillar and B-pillar, or a B-pillar and C-pillar. The door ring blank used to form the door ring includes a reinforcement portion which extends through the at least one door opening portion, and is then hot stamped in the same die with the door ring blank. In other words, the reinforcement portion is not welded or otherwise attached to the pillar portion of the door ring blank prior to hot stamping, but rather is a separate part of the blank which is separately formed into a reinforcement while forming the door ring. In a preferred arrangement, the reinforcement portion is located in a free space, e.g., the door opening portion of the door ring blank, during the hot stamping step in the die. After hot stamping, the formed reinforcement is removed from the formed door ring, and then attached to the door ring in a desired location of reinforcement, such as in overlaying relationship with one of the formed pillars.

The invention also provides a method of manufacturing a structural component, for example a door ring, for an automotive vehicle. The method includes providing a door ring blank, wherein the blank can include pillar portions and rail portions for use in forming respective portions of a door ring. The door ring blank also includes at least one reinforcement portion located in a free space, e.g., a door opening portion, disposed between the pillar and rail portions. The reinforcement portion is not attached to one of the pillar portions, as in the prior art processes, but rather is a separate part of the door ring blank. The method proceeds by heating the door ring blank, and disposing the heated blank in the die. The method then includes hot stamping the door ring blank, which includes the reinforcement portion extending through the at least one door opening portion, together in the die. After the hot stamping step, the reinforcement formed in the door opening is removed from the stamped door ring, and then attached to a desired location of the door ring, such as in overlaying relationship with a respective one of the pillars.

The method can be conducted with a reduced heating time, reduced cooling time, and overall reduced cycle time, due to the reduced thickness and lack of air gaps between the door ring blank and reinforcement portion. In other words, the reinforcement portion does not overlay the pillar portion for which it is intended to reinforce during hot stamping, and thus the efficiency of the process is improved.

BRIEF DESCRIPTION OF THE DRAWINGS

Other advantages of the present invention will be readily appreciated, as the same becomes better understood by reference to the following detailed description when considered in connection with the accompanying drawings wherein.

DESCRIPTION OF THE EXAMPLE EMBODIMENTS

Figure 1:
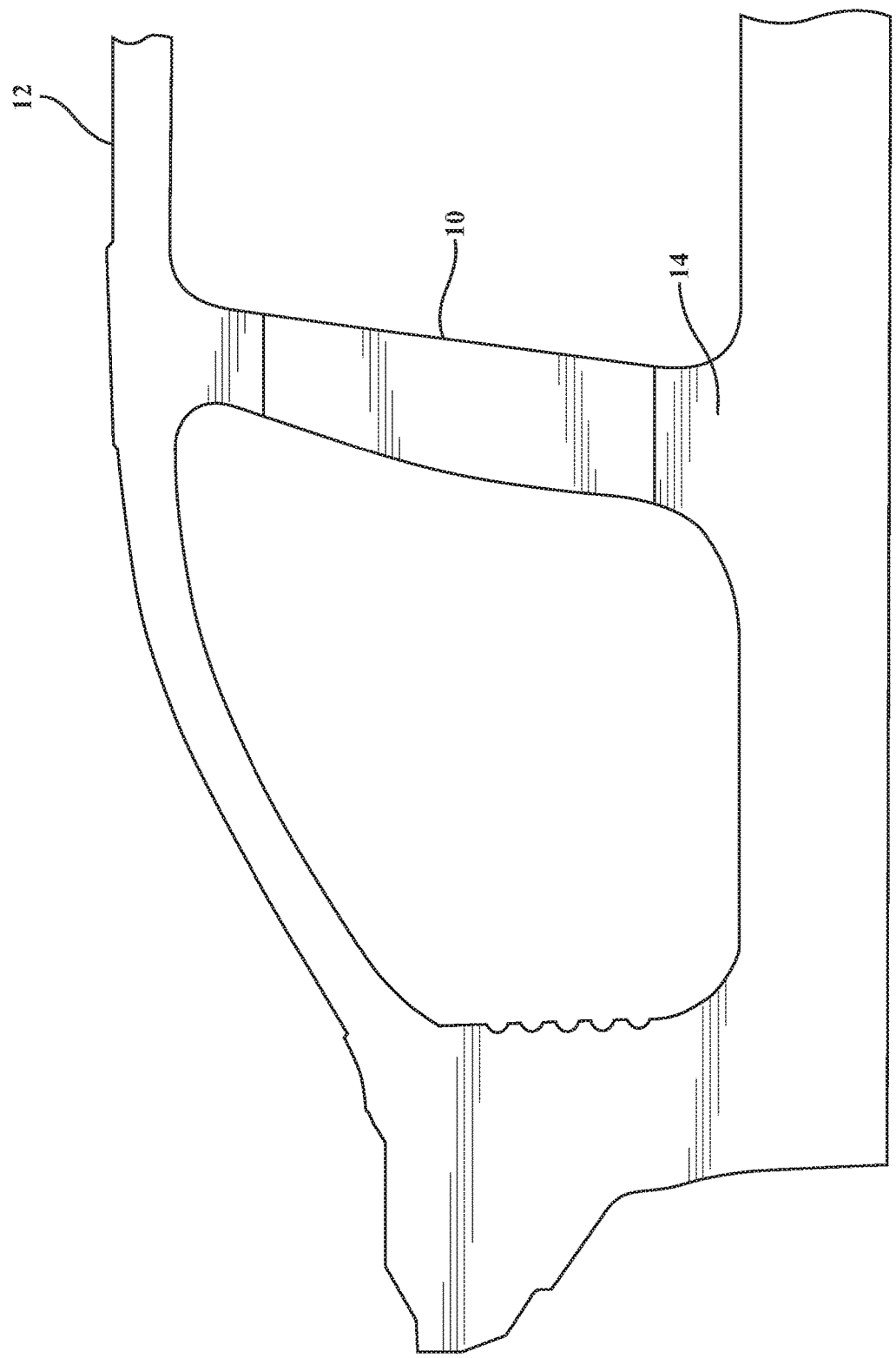
FIG. 1 illustrates a prior art door ring blank including a reinforcement portion disposed in overlaying and attached relationship with a pillar portion.
Figure 4:
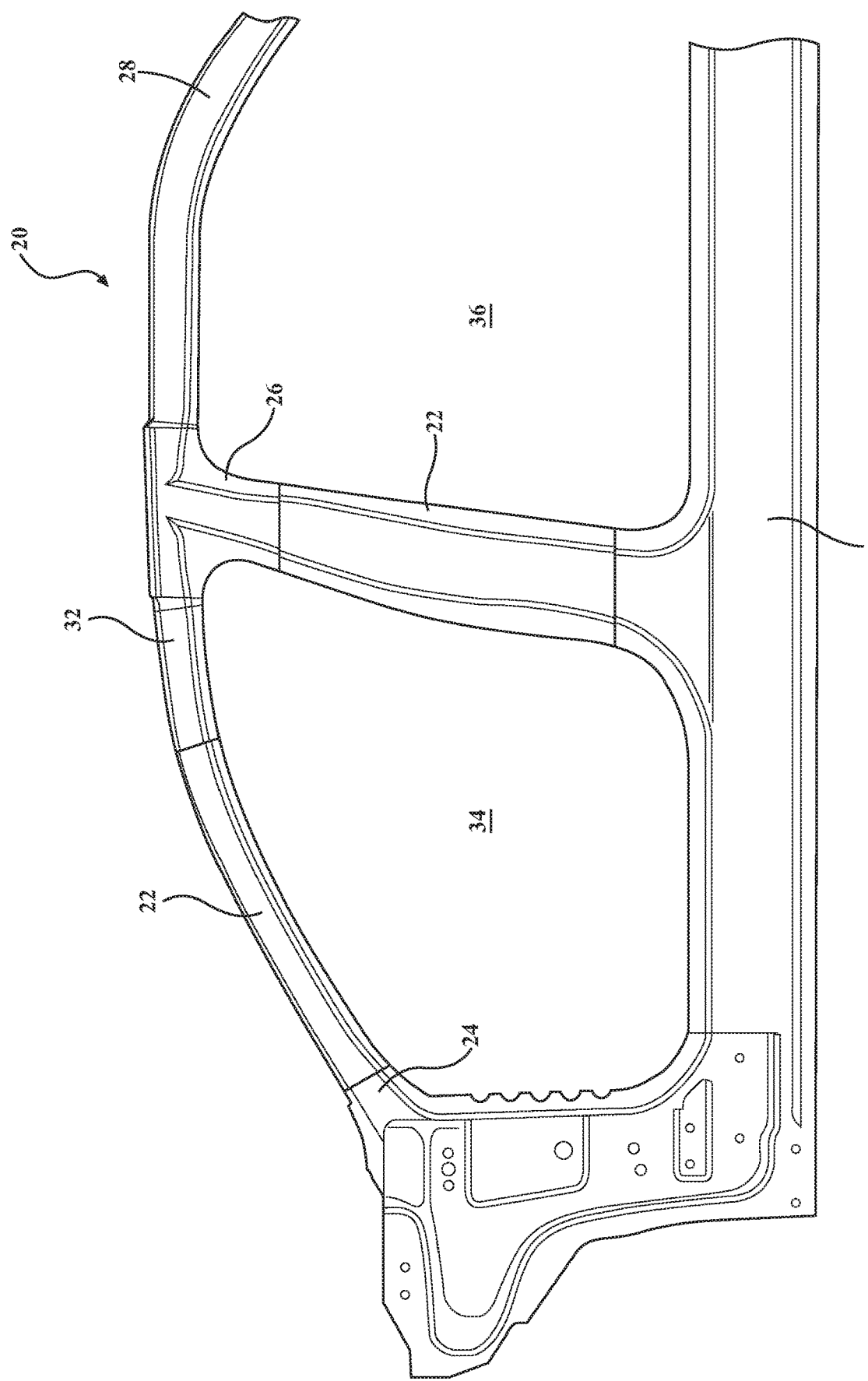
FIG. 4 illustrates the reinforcement removed from the at least one door opening and attached to the at least one pillar of the door ring.

With reference FIG. 4, the invention ultimately provides a structural component, such as a door ring 20, for an automotive vehicle, which includes at least one reinforcement 22 to increase the strength of the door ring 20. As mentioned previously, the method used to manufacture the door ring 20 can be conducted with a reduced heating time, reduced cooling time, reduced overall cycle time, and improved efficiency, compared to other methods used to form door rings, such as by hot stamping the comparative door ring blank 12 of FIG. 1.

As best illustrated in FIG. 4, the door ring 20 formed from the subject method preferably includes a plurality of pillars 24, 26, 28 and rails 30, 32 surrounding at least one door opening 34, 36. For example, the door ring 20 can include an A-pillar 24, an B-pillar 26, and a lower rail 30 disposed around a front door opening 34, and a B-pillar 26, a C-pillar 28, the lower rail 30, and an upper rail 32 disposed around a rear door opening 36. However, the door ring 20 can include additional or fewer pillars, and other designs besides the door ring shown and formed in FIG. 4.

The door ring 20 is comprised of metal, typically a steel material. In the example embodiment, the pillars 24, 26, 28, lower rail 30, and upper rail 32 are formed of a boron-based medium carbon steel material. This material includes 5 weight percent (wt. %) to 10 wt. % boron and 12 wt. % to 35 wt. % carbon, based on the total weight of the material. The material preferably has yield strength of 950 MPa to 1300 MPa, an ultimately tensile strength of 1350 MPa to 2000 MPa, and an elongation of greater than 5%. The material of the door ring 20 can be coated or uncoated.

As mentioned previously, the door ring 20 also includes at least one reinforcement 22 to increase the strength in certain areas of the door ring 20. The reinforcement 22 can be attached to the door ring 20 in various different locations. For example, the reinforcement 20 can ultimately be aligned with and attached to one of the pillars 24, 26, 28 of the door ring 20. In the example embodiment of FIG. 4, the door ring 20 includes multiple reinforcements 22, with a first reinforcement 22 attached to the A-pillar 24 and a second reinforcement 22 attached to the B-pillar 26.

The reinforcements 22 are also formed of metal, typically the same steel material as the other components of the door ring 20. In the example embodiment, the reinforcements 22 are formed of a boron-based medium carbon steel material, which is the same material as the pillars 24, 26, 28 and rails 30, 32. This material includes 5 weight percent wt. % to 10 wt. % boron and 12 wt. % to 35 wt. % carbon, based on the total weight of the material. The material preferably has a yield strength of 950 MPa to 1300 MPa, an ultimately tensile strength of 1350 MPa to 2000 MPa, and an elongation of greater than 5%. The material of the reinforcements 22 can also be coated or uncoated.

Figure 2:
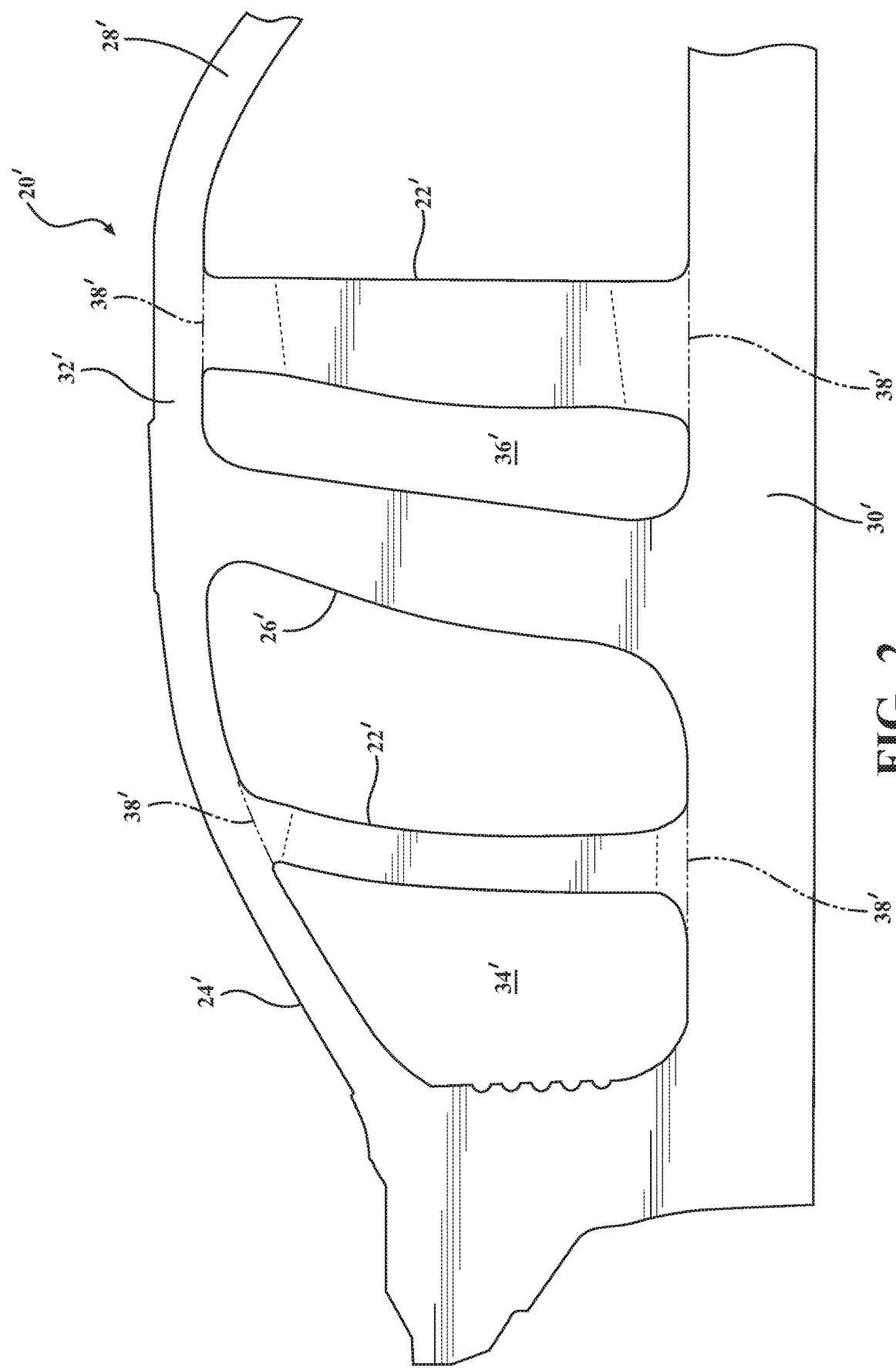
FIG. 2 illustrates a door ring blank including at least one pillar portion, at least one door opening portion, and at least one reinforcement portion extending through the at least one door opening portion according to an aspect of the subject disclosure.
Figure 3:
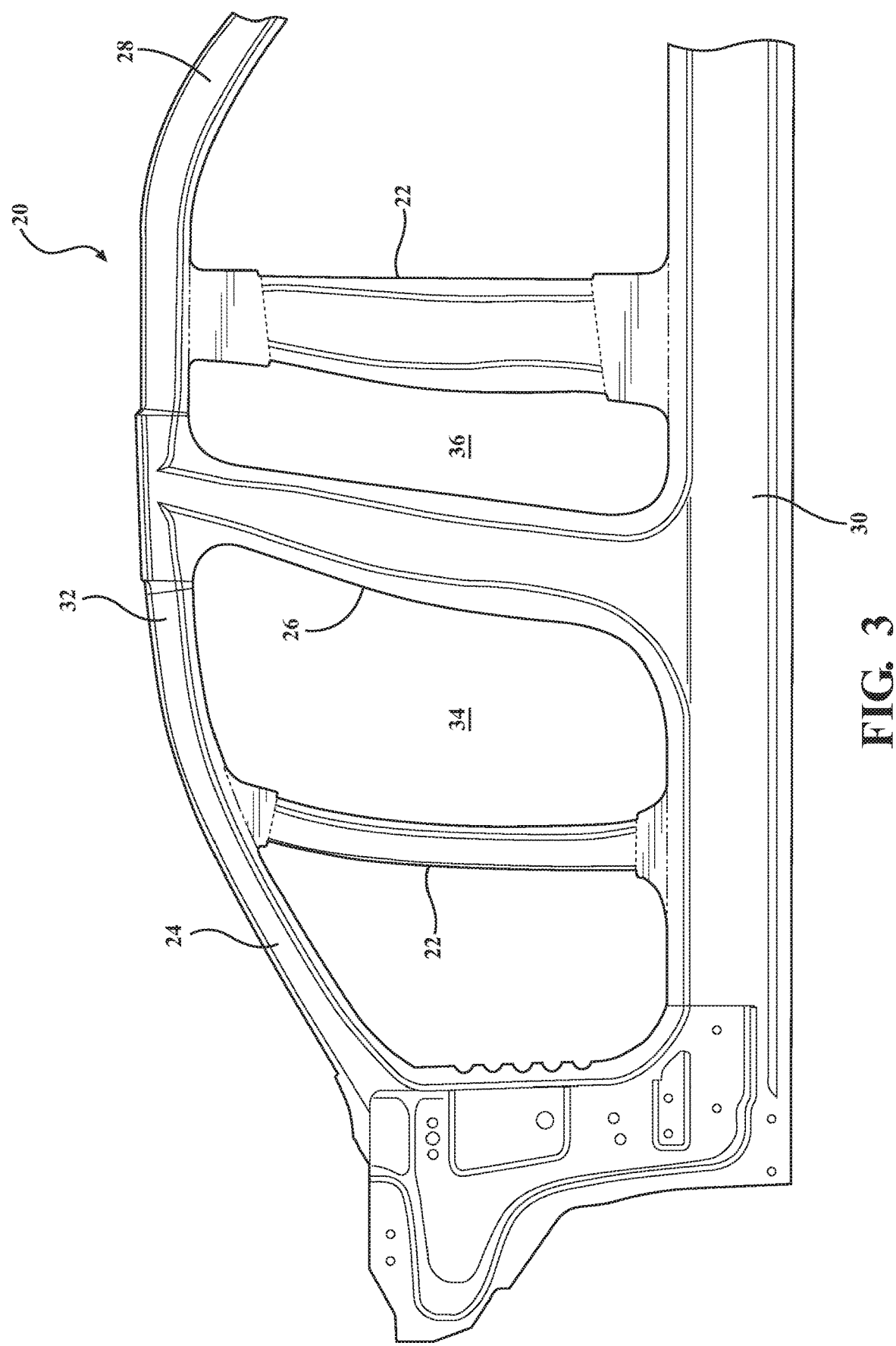
FIG. 3 illustrates a door ring and at least one reinforcement formed from the door ring blank.

However, unlike the comparative door rings with reinforcements, the reinforcements 22 of the subject invention are not formed by first attaching or welding them to their respective pillars 24, 26 before hot stamping in the die. Rather, as will be explained in more detail below, the reinforcements 22 are formed from a separate part of the blank used to form the door ring 20 and hot stamped in the same die. For example, as best illustrated in FIG. 2, during the hot stamping step, each reinforcement 22 is formed from a reinforcement portion 22' of a door ring blank 20' which is located in a free space between two pillar portions 24', 26', 28', for example in one of the door opening portions 34', 36'. As best illustrated in sequential FIGS. 3-4, after the hot stamping step, the formed reinforcements 22 are separated from the remainder of the door ring 20, and then attached to the formed door ring 20 in the desired location, such as in attached and aligned relationship with one of the respective pillars 24, 26. The formed reinforcement 22 can be attached to the door ring 20 by various different methods, such as by spot welding, laser welding, metal insert gas (MIG) welding, mechanical lock, or another joining mechanism.

Another aspect of the subject disclosure provides a method of manufacturing a structural component for an automotive vehicle, for example the door ring 20 illustrated in FIG. 4. As best illustrated in FIG. 2, the method first includes providing a door ring blank 20' defining at least one door opening portion 34', 36'. The door ring blank 20' also includes at least one reinforcement portion 22' extending through the at least one door opening portion 34', 36'. In a preferred arrangement, the door ring blank 20' also includes an A-pillar portion 24', a B-pillar portion 26', a C-pillar portion 28', a lower rail portion 30', and an upper rail portion 32'. The at least one door opening portion 34', 36' preferably includes a front door opening portion 34' collectively defined or bordered by the A-pillar portion 24', the B-pillar portion 26', the lower rail portion 30', and the upper rail portion 32', as well as a rear door opening portion 36' collectively defined or bordered by the B-pillar portion 26', the upper rail portion 32', the C-pillar portion 28', and the lower rail portion 30'. Each of the portions of the door ring blank 20' correspond with respective structural features ultimately formed in the resultant door ring 20 of FIG. 4.

As further illustrated in FIG. 2, in a preferred arrangement, the door ring blank 20' can include multiple reinforcement portions 22' each extending through a respective door opening portion 34', 36'. For example, a first reinforcement portion 22' can be disposed in the front door opening portion 34' and extends from a top end attached to the A-pillar portion 24' to a bottom end attached to the lower rail portion 30' of the door ring blank 20'. Thus, the majority of the first reinforcement portion 22' is disposed in the free space of the front window opening portion 34' during the ensuing hot stamping step. Also in this example embodiment, a second reinforcement portion 22' can be disposed in the rear door opening portion 36' and extends from a top end attached to the upper rail portion 32' to a bottom end attached to the lower rail portion 30' of the door ring blank 20'. Thus, the majority of the second reinforcement 22 is disposed in the free space of the rear window opening 26 during the ensuing hot stamping step.

In an arrangement, the at least one reinforcement portion 22' can be formed as a separate component and then attached to the respective pillars or rails of the door ring blank 20' via spot welding, laser welding, metal insert gas (MIG) welding, mechanical lock, or another joining mechanism 38'. However, in another arrangement, the at least one reinforcement portion 20' can be formed or blanked as an integral part of the door ring blank 20'. For example, the door ring blank 20' including the at least one reinforcement portion 20' can be laser cut or stamped from a single sheet of metal.

Once the door ring blank 20' including the at least one reinforcement portion 22' is formed, the method proceeds by heating the door ring blank 20', and disposing the heated door ring blank 20' in the stamping die. The method then proceeds by hot stamping the door ring blank 20' in the die to form the door ring 20 and the at least one reinforcement 22 illustrated in FIG. 3. During the hot stamping step, the at least one reinforcement 22' is located in a free space between the pillar and rail portions of the door ring blank 20'. After the hot stamping step, the method proceeds by removing the stamped door ring 20 and reinforcement 22 from the stamping die, and transferring the formed components to a separate station for removing the at least one reinforcement 22, for example by laser or in-die trimming, from the door ring 20.

After removing the stamped reinforcements 22, and as best illustrated in FIG. 4, the method proceeds by attaching the at least one reinforcement 22 to the door ring 20 in a desired location. For example, the at least one reinforcement 22 can be attached and aligned with a respective one of the pillars 24, 26, 28. Various methods can be used to attach the at least one reinforcement 22 to the door ring 20. For example, the method can include spot welding, laser welding, metal insert gas (MIG) welding, mechanical lock, or another joining mechanism.

The method provides numerous advantages over the comparative process. For example, the door ring blank 20' has a reduced thickness as compared to the prior art door ring blank 10 of FIG. 1, since the reinforcement portion 22' is not aligned with and overlaying either of the pillar portions 24', 26', and thus the heating and cooling times during the heating and stamping steps are reduced. In addition, there are no air gaps between the reinforcement portion 22' and the respective pillar portions 24', 26', 28' as are present in the comparative process. The lack of air gaps also reduces heating and cooling time. Thus, the overall cycle time and efficiency of the method of manufacturing the door ring 20 from a door ring blank 20' which includes a reinforcement portion 22' extending through a door opening portion 34', 36' improves over the prior art processes.

Many modifications and variations of the present disclosure are possible in light of the above teachings and may be practiced otherwise than as specifically described while within the scope of the invention. Thus, the foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A method of manufacturing a structural component for a vehicle comprising:
    providing a door ring blank including an upper rail portion, a lower rail portion, and a pillar portion extending between the upper and lower rail portions;
    the upper rail portion, the lower rail portion, and the pillar portion defining a door opening portion, and the door ring blank including at least one reinforcement portion extending through the door opening portion between the upper and lower rail portions; and
    hot stamping the pillar portion, the upper rail portion, the lower rail portion, and the at least one reinforcement portion of the door ring blank together to form a door ring including a pillar, an upper rail, a lower rail, a door opening, and at least one reinforcement extending through the door opening between the upper and lower rails.

2. A method as set forth in claim 1, further comprising:
    removing the at least one reinforcement from the door ring; and
    fixedly attaching the at least one reinforcement to the pillar to reinforce the pillar of the door ring.

3. A method as set forth in claim 1, further comprising:
    wherein said step of providing the door ring blank includes cutting a metal sheet to integrally form the at least one reinforcement portion with the door ring blank.

4. A method as set forth in claim 2, wherein said step of fixedly attaching includes spot welding the at least one reinforcement portion to the door ring blank.

5. A method as set forth in claim 2, wherein said step of fixedly attaching includes metal insert gas (MIG) welding the at least one reinforcement portion to the door ring blank.

6. A method as set forth in claim 1,
    wherein the pillar portion of the door ring blank is an a-pillar portion and the door opening portion is a front door opening portion; and
    wherein the pillar of the door ring formed by the hot stamping is an a-pillar, and the door opening is a front door opening.

7. A method as set forth in claim 6, further comprising:
    removing the at least one reinforcement from the front door opening; and
    fixedly attaching the at least one reinforcement to the a-pillar to reinforce the a-pillar of the door ring.

8. A method as set forth in claim 1,
    wherein the pillar portion of the door ring blank is a b-pillar portion, and the door opening portion is a rear door opening portion, and
    wherein the pillar of the door ring formed by the hot stamping is a b-pillar, and the door opening is a rear door opening.

9. A method as set forth in claim 8, further comprising:
    removing the at least one reinforcement from the rear door opening; and
    fixedly attaching the at least one reinforcement to the b-pillar to reinforce the b-pillar of the door ring.

10. A method as set forth in claim 1,
    wherein the pillar portion is an a-pillar portion, the door ring blank further includes a b-pillar portion, the door opening portion is a front door opening portion, the door ring blank further includes a rear door opening portion, and the at least one reinforcement portion including a first reinforcement portion extending through the front door opening between the upper and lower rail portions and a second reinforcement portion extending through the rear window opening portion between the upper and lower rail portions, and
    wherein said step of hot stamping includes hot stamping the a-pillar portion, the upper rail portion, the lower rail portion, the b-pillar portion, and the reinforcement portions of the door ring blank together to form the door ring including an a-pillar, an upper rail, a lower rail, a b-pillar, a front door opening, a rear door opening, a first reinforcement extending through the front door opening, and a second reinforcement extending through the rear door opening.

11. A method as set forth in claim 10, further comprising:
    removing the first reinforcement from the front door opening;
    removing the second reinforcement from the rear door opening;
    fixedly attaching one of the first or second reinforcements to the a-pillar to reinforce the a-pillar of the door ring;
    fixedly attaching the other of the first or second reinforcements to the b-pillar to reinforce the b-pillar of the door ring.

12. A method as set forth in claim 2, further comprising:
    wherein said step of removing the at least one reinforcement from the door ring includes laser or in-die trimming the at least one reinforcement from the door ring.

13. A blank for use in manufacturing a structural component for an automotive vehicle comprising:
    a door ring blank including an upper rail portion, a lower rail portion, and a pillar portion extending between said upper and lower rail portions;
    said upper rail portion, said lower rail portion, and said pillar portion defining a door opening portion and said door ring blank including at least one reinforcement portion extending through said door opening portion between said upper and lower rail portions.

14. A blank as set forth in claim 13, further comprising:
said pillar portion of said door ring blank being an a-pillar portion, and said door ring blank further including a b-pillar portion;
said door opening portion being a front door opening portion collectively defined by said a-pillar portion, said b-pillar portion, said upper rail portion, and said lower rail portion; and
said at least one reinforcement portion extending through said front door opening portion.

15. A blank as set forth in claim 13, further comprising:
said pillar portion of said door ring blank being a b-pillar portion, and said door ring blank further including a c-pillar portion extending between said upper and lower rail portions;
said door opening being a rear door opening portion collectively defined by said b-pillar portion, said c-pillar portion, said upper rail portion, and said lower rail portion; and
said at least one reinforcement portion extending through said rear door opening portion.

16. A blank as set forth in claim 14, further comprising:
said door ring blank further including a c-pillar portion;
said door ring blank further including a rear door opening portion collectively defined by said b-pillar portion, said c-pillar portion, said upper rail portion, and said lower rail portion; and
said at least one reinforcement portion including a first reinforcement extending through said front door opening portion and a second reinforcement portion extending through said rear door opening portion.

17. A blank as set forth in claim 14, wherein said door ring blank is comprised of a boron-based medium carbon steel material including 5-10 wt. % boron and 12-35 wt. % carbon.

18. A blank as set forth in claim 14, wherein said boron-based medium carbon steel material has a yield strength of 950 MPa to 1300 MPa.

\* \* \* \* \*